United States Patent [19]

O'Rourke

[11] 4,215,152

[45] Jul. 29, 1980

[54] STARCH FOR INSTANT PUDDING

[75] Inventor: Joseph D. O'Rourke, Dover, Del.

[73] Assignee: General Foods Corporation, White Plains, N.Y.

[21] Appl. No.: 960,219

[22] Filed: Nov. 13, 1978

[51] Int. Cl.$^2$ .......................................... A23L 1/187
[52] U.S. Cl. ..................................... 426/579; 426/661
[58] Field of Search ....................... 426/578, 579, 661

[56] References Cited

U.S. PATENT DOCUMENTS

| 3,231,391 | 1/1966 | Breivik | 426/579 |
| 3,332,785 | 7/1967 | Kuchinke et al. | 426/578 |
| 3,443,990 | 5/1969 | Deenop | 426/578 |
| 3,471,301 | 10/1969 | Mitchell | 426/578 |
| 3,537,893 | 11/1970 | Hauser | 127/71 |
| 3,893,842 | 7/1975 | Glabe | 426/578 |
| 3,917,875 | 11/1975 | Gardiner | 426/578 |

*Primary Examiner*—Jeanette M. Hunter
*Attorney, Agent, or Firm*—Mitchell D. Bittman

[57] ABSTRACT

A pregelatinized starch product suitable for use in instant puddings is prepared by a process which comprises drum drying a slurry containing an ungelatinized starch in water with a protein and an emulsifier. Preferably the protein is sodium caseinate and the emulsifier is polysorbate 60. The resultant starch is especially suited for instant pudding in that it possesses an excellent texture, creaminess, and mouth release effect, but without the necessity of any chemical modification of the starch molecule.

11 Claims, 1 Drawing Figure

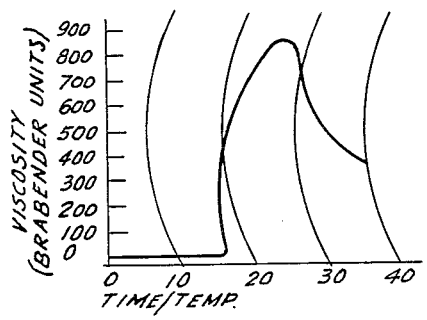
AMYLOGRAPH CURVE
OF TAPIOCA STARCH.
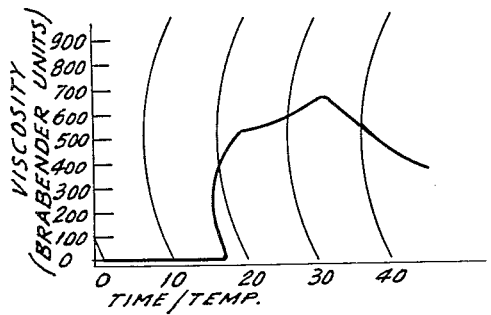
AMYLOGRAPH CURVE OF TAPIOCA
STARCH WITH POLYSORBATE 60
(.4%) AND SODIUM CASEINATE
(.2%)
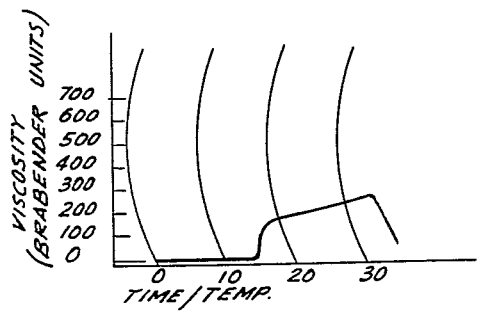
AMYLOGRAPH CURVE
OF CHEMICALLY
MODIFIED TAPIOCA
STARCH.

STARCH FOR INSTANT PUDDING

BACKGROUND OF THE INVENTION

The present application is concerned primarily with the method of obtaining starch products, suitable for use in instant puddings utilizing a starch such as tapioca starch which is not chemically modified by the addition of any chemicals which react with the starch. In the present process the starch is physically modified by complexing and drum drying the tapioca starch with certain specific additives which act to mimic the characteristics of a chemically modified starch in an instant pudding formulation. Among the desirable characteristics are firmness, creaminess, smoothness, gloss, and a melt away or mouth release effect. The desired objective is to obtain a good quality starch for use in instant pudding without the necessity of chemical modification of the starch molecule itself. Additionally, since no chemicals will be utilized to react with a starch, the otherwise necessary step of washing a starch to remove reaction salts or residues formed during manufacturing is not necessary. Thus, the environmental problem of disposing of chemical effluents is eliminated.

SUMMARY

Briefly, the instant invention provides a starch with the desirable characteristics by the addition of a protein and an emulsifier to a slurry of ungelatinized starch and thereafter gelatinizing and drying the starch slurry with a drum drier. Preferably the protein is either sodium caseinate gelatin, egg albumin or a soy protein isolate, and the emulsifier is either lecithin or polysorbate 60, but optimum results are achieved by utilizing the combination of sodium caseinate and polysorbate 60. The resultant starch yields a product having the desirable characteristics which mimic those obtained by chemical modification of starch and which is especially suited for use in instant pudding mixes.

BRIEF DESCRIPTION OF THE DRAWING

The Figures are amylograph curves of: tapioca starch; tapioca starch modified with polysorbate 60 and sodium caseinate; and chemically modified tapioca starch.

DISCLOSURE OF THE INVENTION

The instant invention is concerned with producing a pregelatinized starch by drum drying an aqueous slurry containing a protein, an emulsifier and an ungelatinized starch. The resultant modified starch when ground to a fine particle size can be used in making an instant pudding which closely matches those made using chemically modified pregelatinized starches. The emulsifier acts to impart a creaminess, smoothness and gloss to the resultant puddings, while the protein adds viscosity and increases the texture and mouthfeel. The combination of the two ingredients, emulsifier and protein, provide advantages over plain starch that neither ingredient can fully produce independent of the other. Addition of a protein alone may result in undesirable gumminess and poor appearance, while addition of an emulsifier alone can result in loss of viscosity, but the combination of the two yields a synergistic effect resulting in a pregelatinized starch having desirable characteristics which mimic chemically modified starches, i.e., desirable texture, appearance, mouthfeel and viscosity.

Various starches may be modified according to the process of the instant invention including corn, potato, rice and amioca. However, tapioca starch is preferred as it has long been considered the prime starch source for instant puddings because of its clean taste and minimal flavor-masking effects.

Various emulsifiers can be employed in the drum drying process to contribute creaminess, smoothness and gloss to the resultant pregelatinized starch when employed in instant puddings. These emulsifiers include lecithin, polyglycerol mono-stearate, mono and diglycerides, glycerol lactyl palmitate, glycerol lactyl oleate, succinylated monoglycerides, sorbitan monopalmitate, polyglycerol monophosphate, and phosphated mono glycerides. However, the most preferred emulsifier is polysorbate 60 (polyoxyethylene (20) sorbitan monostearate) as it acts to impart characteristics to the resultant starch which most closely mimic a chemically modified starch, such as starches chemically modified with propylene oxide and either epichlorohydrin or phosphorus oxychloride.

The protein employed in the slurry can be gelatin, egg albumin or soy protein isolate, but the most preferable protein is sodium caseinate. Sodium caseinate when combined with an emulsifier, especially polysorbate 60, imparts optimum characteristics to the resultant pregelatinized starch which most closely mimics a chemically modified starch, such as a cross-linked starch modified with propylene oxide. Both the emulsifier and the protein are employed at levels effective to impart the desired creaminess, smoothness, gloss, viscosity, texture and mouthfeel to the resultant pregelatinized starch. These levels may vary depending upon the emulsifier and the protein, as well as the specific starch being so modified. Preferably when a starch, such as tapioca starch, is modified with polysorbate 60 and sodium caseinate, the sodium caseinate is employed at levels of about 0.05 to 2% by weight of the starch, and polysorbate 60 is employed at levels of from about 0.2 to 1% by weight of the starch.

When a slurry is formed preparatory to drum drying, the level of starch in the slurry must be such as can be effectively dried in the particular drum drier employed, as is common in the art. Generally, the level of starch in the slurry is within about 15 to 50%, preferably 20 to 40% by weight of the slurry. After the addition of an effective amount of a protein and an emulsifier, the slurry is then drum dried under conditions tailored to optimize the textural, sheeting and drying characteristics of the particular starch being processed. Either a single drum drier or a double drum drier can be employed. A double drum drier is preferably employed under the following conditions: water 50 to 85% by weight of the slurry; starch 15 to 50% by weight of the slurry; slurry temperature 5° to 45° C.; slurry pH of 4 to 8; holding time of 0 to 24 hours; drier gap of 0.001 to 0.005 cm; rpm of 0.5 to 7; and steam pressure of 0.7 to 7 kg per sq cm. Optimum conditions for a double drum drier would generally be that the starch, at a level of about 20% by weight of the slurry, is slurried in the water with a protein and an emulsifier at a temperature of about 20° C., the slurry being adjusted to a pH of 6 and the drum drier being adjusted so that the holding time is one hour, the drier gap is about 0.003 cm, the rpm is 3 and the steam pressure is 4.2 kg per sq cm. When a single drum drier is employed, the following conditions are preferably employed: water 50 to 80% by weight of the slurry; starch 20 to 50% by weight of the slurry; pH of 5.5 to 6.5; holding time of 0 to 24 hours; steam pressure of 2.8 to 11.3 kg per sq cm; with the applicator roll generally being adjusted to produce minimum sheet thickness and the rpm adjusted to attain a moisture content of 2 to 9%.

After drum drying, the resultant pregelatinized starch is then ground and screened to a size suitable for use in a product, such as an instant pudding. Preferably, the dried pregelatinized starch is ground to a size wherein the particles pass through a 200 mesh U.S. Standard screen, optimally to a size wherein at least 95% by weight of the particles pass through a 230 mesh U.S. Standard screen.

A further unexpected advantage of drum drying a starch with a protein and emulsifier, such as sodium caseinate and polysorbate 60, is that this combination contributes sufficient body to the resultant puddings in order to allow a significant reduction in the amount of starch needed to prepare a satisfactory pudding. The reduction in the amount of starch minimizes flavor-masking effects of the starch by minimizing the starch flavor, which is common when a high percentage of starch is employed in a pudding.

The amylograph curve (in the Drawing) of tapioca starch modified with polysorbate 60 and sodium caseinate by the process of this invention demonstrates the increased process tolerance and stability of granules modified with a protein and an emulsifier. A comparison of the amylograph curves (in the Drawing) of tapioca starch, of tapioca starch modified with polysorbate 60 and sodium caseinate and of chemically modified tapioca starch (modified with phosphorus oxychloride and acetic anhydride) demonstrates that by modifying tapioca starch with polysorbate 60 and sodium caseinate, the peak viscosity is suppressed while, more importantly, the peak is broadened similarly to that of chemically modified tapioca starch. This broadening of the peak indicates that the maximum swell of the granules can be attained for a longer period of time. Even though these additives cannot prevent the granules from rupturing during drum drying, they do retard the extreme overprocessing of the starch which can completely destroy all granules and granule fractions allowing for the dispersion of starch molecules which give a mucid mouthfeel to the puddings. While sodium caseinate (as generally with other proteins) itself does not alter the amylograph, it does help to strengthen the milk/phosphate/starch complex resulting in more mouthfeel and viscosity. The increased mouthfeel and viscosity allows the load-weight of starch to be employed in the pudding to be reduced, such reduction in starch level in turn reducing starch flavor and flavor-masking effects of the starch.

The following examples serve to illustrate various embodiments of the present invention but are not intended to limit the invention which is defined in the appended claims.

Example I

A slurry was formed containing tapioca starch in water, the starch being present at a level of about 40% by weight of the slurry. Polysorbate 60 at a level of 0.4% by weight of the tapioca starch and sodium caseinate at a level of 0.2% by weight of the tapioca starch were added and mixed into the slurry. The slurry at room temperature was adjusted to a pH of 6 with phosphoric acid and then dried on a single drum drier under the following conditions: steam pressure of 2.8 kg per sq cm; a holding time of 1 hour; and with the applicator roll and rpm adjusted to attain a minimum sheet thickness and a moisture content of 4–5%. After drying, the starch was ground and screened through a 230 mesh U.S. Standard screen.

When evaluated in an instant pudding mix, the resultant prepared pudding was found to be very near parity to puddings prepared utilizing a chemically modified starch, particularly a tapioca starch modified with propylene oxide and epichlorohydrin. The resultant prepared pudding possessed a smooth, creamy mouthfeel and a glossy surface, but without a mucid mouthfeel.

Example II

Polysorbate 60 at a level of 0.4% by weight of the starch and sodium caseinate at a level of 0.2% by weight of the starch were added and mixed into an aqueous slurry containing 40% of amioca starch by weight of the slurry. The slurry, at room temperature, was adjusted to a pH of 6 with phosphoric acid and then dried on a double drum dryer under the following conditions: holding time of 1 hour; dryer gap of 0.003 cm; rpm of 3 and steam pressure of 5.6 kg per sq cm. After drying, the starch was ground and screened through a 230 mesh U.S. Standard screen.

When the modified amioca starch was evaluated in an instant pudding mix, the resultant pudding had a smooth and creamy mouthfeel, a firm texture and a glossy surface, but without a mucid mouthfeel. The resultant pudding was judged to be near parity to puddings prepared utilizing a chemically modified amioca starch, i.e., amioca starch modified with propylene oxide and epichlorohydrin.

Example III

An aqueous slurry was prepared containing tapioca starch at a level of 40% by weight of the slurry, gelatin at a level of 3.7% by weight of the starch, and lecithin at a level of 0.2% by weight of the starch. The slurry, at room temperature and a pH of 6, was dried on a double drum dryer and ground under the conditions specified in Example II.

The modified tapioca starch, when evaluated in an instant pudding mix, exhibited a gel-like texture with a slow melt-away or mouth release effect as well as having a smooth, creamy mouthfeel, a firm texture and a glossy surface without a mucid mouthfeel. These desirable attributes mimicked the attributes obtained through use of chemically modified starches.

What is claimed is:

1. A process for making a dry pregelatinized starch product suitable for use in an instant pudding comprising: mixing an aqueous slurry of ungelatinized starch in water with a protein and an emulsifier, the amount of emulsifier and protein being effective to impart the resultant pregelatinized starch when reconstituted with creamy, smooth, viscous and glossy characteristics suitable for use in an instant pudding mix, thereafter gelatinizing and drying the slurry in a drum drier.

2. Process of claim 1 wherein the protein is chosen from the group consisting of sodium caseinate, egg albumin, gelatin, and soy protein isolate.

3. Process of claim 2 wherein the emulsifier is chosen from the group consisting of lecithin and polysorbate 60.

4. Process of claim 3 wherein 15 to 50% by weight of starch is in the slurry.

5. Process of claim 4 wherein the starch is tapioca starch.

6. Process of claim 5 wherein the slurry contains sodium caseinate at a level of about 0.05 to 2% by weight of the starch and polysorbate 60 at a level of about 0.2 to 1% by weight of the starch.

7. Process of claims 3 or 6 wherein the dried starch slurry is ground into a size wherein the particles pass through a 200 mesh U.S. Standard screen.

8. Product prepared by the process of claims 1, 2, 3 or 6.

9. Product prepared by the process of claim 7.

10. In an instant pudding mix the improvement comprising a dry pregelatinized starch prepared by the process of claim 1.

11. In an instant pudding mix the improvement comprising a dry pregelatinized starch prepared by the process of claim 7.

* * * * *